United States Patent Office 3,389,152
Patented June 18, 1968

3,389,152
ALKOXYALKOXY-BROMO-1,4,5,8-TETRA-
HYDROXYANTHRAQUINONES
Ernest M. May, Summit, and Andrew Fono, Montclair,
N.J., assignors to Otto B. May, Inc., Newark, N.J., a
corporation of New Jersey
No Drawing. Filed Feb. 4, 1964, Ser. No. 342,547
11 Claims. (Cl. 260—383)

ABSTRACT OF THE DISCLOSURE

This specification is concerned with tetrahydroxyanthraquinone compounds having one bromo substituent and one alkoxyalkoxy or alkoxyalkoxyalkoxy substituent on the ring. These compounds are suitable for dyeing shaped articles, such as metal-modified polyolefin fibers.

---

This invention relates to new disperse dyes which are suitable for dyeing shaped articles of metal-modified polyolefins; and, more particularly, it is concerned with the dyed shaped articles therefrom.

In the past, many classes of dyes have been applied to shaped articles, such as synthetic fibers, in an attempt to dye these articles in a commercially satisfactory way, that is, to yield a brilliant dyed product which is fast to light, washing and dry cleaning. However, these classes of dyes have not been entirely suitable since polyolefin shaped articles dyed therefrom have had relatively poor fastness to light and relatively poor brilliance.

An object of the present invention is to obtain dye compositions that are suitable for dyeing shaped articles, e.g., fibers, of polypropylene and other polyolefins containing finely dispersed metal compounds to provide an end product with superior fastness properties and with excellent brilliance and color value.

One of the very difficult problems that has confronted the industry is stabilizing polypropylene and other polyolefin fibers against aging, that is, degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to aging.

Accordingly, another object of this invention is to stabilize shaped articles formed from polypropylene and other polyolefins and preferably to stabilize and color such materials simultaneously.

Another object is to improve stability and the resistance of these polymers to aging, particularly after they have been washed, dry cleaned or exposed to other solvents.

Other objects and advantages of the present invention will appear from the following description.

According to the present invention, it has been found that certain substituted anthraquinone compounds have good affinity for metal-modified polyolefin shaped articles and dye these articles in brilliant shades with excellent fastness to washing, dry cleaning and light. These substituted anthraquinone compounds are described by the following structural formula:

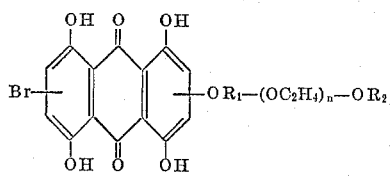

wherein $R_1$ is selected from the group consisting of $C_2H_4$ and $C_3H_6$; $R_2$ is selected from the group consisting of $CH_3$ and $C_2H_5$; and $n$ is a positive integer from 0 to 1. As defined herein, the $OR_1$—$(OC_2H_4)_n$—$OR_2$ substituent may be in the 2 or 3 position and the Br substituent may be in any unoccupied position.

The aforementioned substituents are critical features of this invention. For example, it is important for the substituted anthraquinone compounds to have four hydroxy substituents on the ring. If there are less than four, e.g., three, hydroxy substituents on the ring, suitable compounds for dyeing metal-modified polyolefins are not obtained. It is also important for the success of the invention for the substituted anthraquinone compounds to have one bromo substituent and one alkoxyalkoxy (or alkoxyalkoxyalkoxy) substituent on the ring. Satisfactory results are not obtained for metal-modified polyolefin, e.g., polypropylene, shaped articles dyed with a compound having one alkoxyalkoxy substituent and no bromo substituent; with a compound having two alkoxyalkoxy substituents and no bromo substituent; with a compound having one bromo and no alkoxyalkoxy substituent; nor with a compound having two bromo substituents and one alkoxyalkoxy substituent.

Furthermore, it is necessary in the present invention to have a bromo substituent and not some other halo substituent on the ring of the substituted anthraquinone compound. A suitable dyed metal-modified polyolefin fiber or the like is not provided if, for example, there is a chloro substituent on the anthraquinone compound. It is also necessary herein to have an alkoxyalkoxy (or alkoxyalkoxyalkoxy) substituent on the ring since other somewhat similar substituents, such as a hydroxyalkoxy substituent, on the ring will not provide a compound that is satisfactory for dyeing metal-modified polyolefin shaped articles.

Preferred substituted anthraquinone compounds of this invention are those in which $R_1$ is $C_2H_4$, $R_2$ is $C_2H_5$ and $n$ is 0; in which $R_1$ is $C_2H_4$, $R_2$ is $CH_3$ and $n$ is 1; in which $R_1$ is $C_2H_4$, $R_2$ is $C_2H_5$ and $n$ is 1; and in which $R_1$ is $C_3H_6$, $R_2$ is $C_2H_5$ and $n$ is 0.

The aforementioned substituted 1,4,5,8 - tetrahydroxyanthraquinones may be prepared by employing any suitable method. For example, a dibromotetrahydroxyanthraquinone may be used and one of the bromo groups is exchanged with an alkoxyalkoxy group. The dibromotetrahydroxyanthraquinone may be prepared by brominating tetrahydroxyanthraquinone in an organic solvent, e.g., monochlorobenzene, with iodine as a catalyst. The resultant product has most of the bromo groups in the 2,6 position but some of the bromo groups may be in other positions, such as the 2,7 position. Therefore, dibromotetrahydroxyanthraquinone may be a mixture of 2,6-dibromotetrahydroxyanthraquinone and 2,7 - dibromotetrahydroxyanthraquinone.

A finely dispersed paste is preferably formed from the dyestuff, for example, by milling in the presence of a dispersing agent; or by dissolving in dimethylformamide, drowning in water and filtering in the presence of a dispersing agent; or by dissolving in 93% sulfuric acid at 5 to 10° C., drowning into ice, filtering in the presence of a dispersing agent and washing.

In this invention, a shaped article, for example, a fiber, has a metal incorporated therein before a substituted anthraquinone compound is applied. The metal-modified synthetic fibers or other shaped articles applicable to this invention are the polyolefins. A polyolefin includes the following polymers among others: polyethylene, polypropylene, polybutene, poly - 3 - methylbutene - 1, polypentene, poly - 4 - methyl-pentene - 1, and polyheptene. The preferred polyolefine is polypropylene. The polyolefin, e.g., polypropylene, may be prepared by any known method.

The shaped articles are formed from the aforementioned polymers in accordance with known prior art procedures. A fiber, which is preferred, is defined herein as any fibrous unit, for instance, filament yarns, mats, staple yarns, rovings, sheets, rods, plates, woven fabrics and chopped fibers. The following exemplify specific commercial fibers which can be employed herein: Spun Dacron T-54, manufactured by E. I duPont de Nemours & Co., Inc.; Nylon Filament Thread, manufactured by E. I. duPont de Nemours & Co., Inc.; Cresland T58; Acrilan 1656; Polypropylene 805 Fiber, manufactured by Reeves Brothers, Inc.; Herculon, manufactured by Hercules Powder Co.; and Arnel, manufactured by Celanese Corporation of America.

The substituted anthraquinone compounds heretofore described form the basis of an aqueous dye bath into which the fibers are immersed. Since the dyes are insoluble in water, they must be dispersed in the bath. Any known dyeing technique may be employed in this invention including the methods discussed and referenced in the article by Fortess, Advances in Textile Processing, vol. 1, pages 333–373 to provide a dyed fiber therefrom.

As stated heretofore, the shaped article, e.g., a fiber, is modified with a metallic material. This metallic material which may be a metal salt of $C_6$ to $C_{20}$ carboxylic acid, such as aluminum monostearate, forms a reaction product with the subsequently applied dye composition. Any suitable method, such as the one disclosed in Belgian Pat. No. 617,280 which is incorporated herein by reference, may be used for including the metallic material in the fiber. For example, a metal salt may be dispersed throughout the polymer prior to its extrusion The ratio of fiber to metal and the amount of dye employed for the reaction with the metal are not critical features of this invention. However, a metal-modified polyolefin shaped article is defined herein as a shaped article having additional metal therein besides the metal that may be present from the preparation of the polyolefin polymer itself.

Thus, in accordance with the present invention, substituted anthraquinone compounds have been provided which are suitable dyestuffs for reacting with metal-modified shaped articles to form a brilliant dyed end product which is fast to light, dry cleaning and washing. The superior light fastness and brilliance of the dye on the metal-modified shaped article are surprising features of this invention. It is also surprising that these substituted anthraquinone compounds impart stability to the polyolefin fibers and other shaped articles and resist removal by laundering, dry cleaning, etc.

The following examples are submitted to illustrate but not to limit this invention. Unless otherwise indicated, all parts and percentages in the specification and claims are based upon weight.

EXAMPLE I

The compound, 2,6 - dibromo - 1,4,5,8 - tetrahydroxyanthraquinone, was prepared by dissolving 100 parts leuco - 1,4,5,8 - tetrahydroxyanthraquinone in 100 parts monochlorobenzene. After heating to 80° C., 1.2 parts iodine were added thereto and a mixture of 196 parts bromine and 154 parts sulfuryl chloride was then added over a period of six hours with the temperature being maintained for one hour thereafter. After the bromination was complete (bromine assay between 36.9% and 37.5%; theoretical 37.2%), the aforementioned compound was isolated by steam distillation, filtration and drying.

A dyestuff was provided subsequently by adding 41 parts phenol and 76 parts potassium carbonate to 80 parts 2,6-dibromo - 1,4,5,8 - tetrahydroxyanthraquinone and 960 parts ethylene glycol monoethylether. The reaction mixture was maintained at 130° C. until a sample therefrom had a bromine assay between 16.2% and 20.2% (theoretical 18.2%). The reaction mixture was drowned with stirring into 9600 parts water containing 1000 parts 93% sulfuric acid. After filtering and washing neutral, the filter cake therefrom was finely dispersed in the persence of the sodium salt of sulfonated naphthalene formaldehyde condensate to a 10% aqueous paste.

Fiber grade polyproylene, which was blended intimately and uniformly with 0.080 wt. percent of aluminum monostearate, was used to manufacture 4½ denier crimped staple fiber by melt extruding, stretching, crimping and cutting to a 2 in. length. This cut fiber was subsequently carded and spun to produce yarns approximating .10's single (cotton system) count. Convenient sized skeins were then reeled from this yarn.

A sample containing ten grams of skein was provided. This sample was immersed in a 500 cc. dye bath at 120° F. The bath consists of an aqueous dispersion of 0.6 gram of the dry aforementioned dyestuff. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequently turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of Triton X-100 (iso-octyl-phenyl poly ethoxy ethanol) and ½% of sodium carbonate. A thorough rinse was subsequently performed in running water at 110° F.

The dyed samples were then subjected to the following tests.

(1) Color Fastness to Dry Cleaning:
   Tentative Test Method 85–1960 (1960 Technical Manual of the American Association of Textile Chemists and Colorists, pages 88–9) amended as follows: the temperature shall be 115° C.; the time shall be 1 hour; and the amount of perchlorethylene shall be 200 cc.

(2) Color Fastness to Washing (polypropylene):
   Tentative Test Method 61–1960, test number III–A (1960 Technical Manual of the American Association of Textile Chemists and Colorists, pages 93–4). In each instance, the dyeing shall rate (for polypropylene) as follows: for color loss, class 5; for staining, class 3 or better.

(3) Color Fastness for Washing (synthetics):
   AATCC tentative test method 61–1961 T (Page 105 loc. cit.).

(4) Color Fastness to Light:
   AATCC Standard Test Method 16–A–1960 (Page 90 loc. cit.).

(5) Color Fastness to Oxides of Nitrogen in the Atmosphere (Gas Fading):
   Three cycles were used of Standard Test Method 23–1957 (Page 98 loc. cit.) or Standard Test Method 75–1956 (Page 100 loc. cit.).

(6) Sublimation and Heat Fastness Tests:
   Sublimation and Heat Fastness tests were run at 265° F. for 15 minutes.

The dyed aluminum-modified polypropylene fibers had a brilliant strong blue shade. The dyed fibers were also fast to washing, dry cleaning, sublimation, gas fading and light.

EXAMPLE II

The compounds indicated in Table I include the dye described in Example I and those dyes prepared by comparable procedures with the reactants being varied to form the desired end product. Fibers were dyed with each of the compounds as per Example I.

Table I

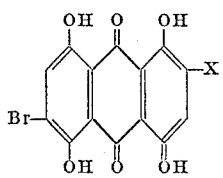

| X substituents: | Dye No. |
|---|---|
| $OC_2H_4OC_2H_5$ | 1 |
| $OC_2H_4OC_2H_4OCH_3$ | 2 |
| $OC_2H_4OC_2H_4OC_2H_5$ | 3 |
| $OC_3H_6OC_2H_5$ | 4 |

All of the dyed products had excellent fastness to washing and dry cleaning. The dyed aluminum-modified polypropylene fibers had a brilliant blue shade.

EXAMPLE III

Other compounds, which are outside the purview of this invention, were prepared and were applied to the aluminum-modified polypropylene fibers of Example I. These compounds are listed herebelow in Table II.

Table II

| Substituents on 1,5,8-trihydroxyanthraquinone: | Dye No. |
|---|---|
| 2-$OC_2H_4OC_2H_5$; 4-OH | 5 |
| 6-Br; 4-OH | 6 |
| 2,6-di-$OC_2H_4OC_2H_5$; 4-OH | 7 |
| 6-Br; 2-$OC_2H_4OH$; 4-OH | 8 |
| 2-$OC_2H_4OH$ | 9 |
| 6-Cl; 2-$OC_2H_4OC_1H_5$; 4-OH | 10 |
| 6,7-di-Br; 2-$OC_1H_4OC_2H_5$; 4-OH | 11 |

The dyed fibers of this example were considered to be unsatisfactory. They had relatively weak, dull shades, and they had relatively poor fastness properties.

This example demonstrates the criticality of having one bromo substituent, one alkoxyalkoxy substituent and four hydroxy substituents on anthraquinone in order to form a compound that provides a superior dyed product when applied to metal-modified polyolefin shaped articles. Inferior dyed products are obtained from anthraquinone compounds without these substituents thereon.

Having set forth the general nature and specific embodiment of the present invention, the scope is now particularly pointed out in the appended claims.

We claim:
1. A compound having the structure:

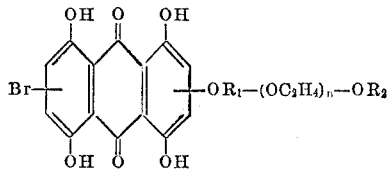

wherein $R_1$ is selected from the group consisting of $C_2H_4$ and $C_3H_6$; $R_2$ is selected from the group consisting of $CH_3$ and $C_2H_5$; and $n$ is a positive integer from 0 to 1.

2. The compound according to claim 1 in which $R_1$ is $C_2H_4$.
3. The compound according to claim 1 in which $R_1$ is $C_3H_6$.
4. The compound according to claim 1 in which $R_2$ is $CH_3$.
5. The compound according to claim 1 in which $R_2$ is $C_2H_5$.
6. The compound according to claim 1 in which $n$ is 0.
7. The compound according to claim 1 in which $n$ is 1.
8. The compound which is 2-ethoxyethoxy-6-bromo-1,4,5,8-tetrahydroxyanthraquinone.
9. The compound which is 2-methoxyethoxyethoxy-6-bromo-1,4,5,8-tetrahydroxyanthraquinone.
10. The compound which is 2-ethoxyethoxyethoxy-6-bromo-1,4,5,8-tetrahydroxyanthraquinone.
11. The compound which is 2-ethoxypropoxy-6-bromo-1,4,5,8-tetrahydroxyanthraquinone.

References Cited

UNITED STATES PATENTS

| 2,922,691 | 1/1960 | Grossman | 260—383 X |
| 2,990,413 | 6/1961 | Gehrke | 260—380 |
| 3,086,977 | 4/1963 | Turetzky | 260—383 X |
| 3,147,284 | 9/1964 | Rhyner | 260—380 X |
| 3,164,615 | 1/1965 | Buecheler | 260—380 X |

FOREIGN PATENTS

| 1,180,736 | 6/1959 | France. |

LORRAINE A. WEINBERGER, *Primary Examiner.*

RICHARD K. JACKSON, *Examiner.*

H. C. WEGNER, *Assistant Examiner.*

UNITED STATES PATENT OFFICE
CERTIFICATE OF CORRECTION

Patent No. 3,389,152                                      June 18, 1968

Ernest M. May et al.

It is certified that error appears in the above identified patent and that said Letters Patent are hereby corrected as shown below:

Column 2, line 62, "example." should read -- example --. Column 3, line 32, after "extrusion" insert a period. Column 5, line 36, "6-Cl; 2-$OC_2H_4OC_1H_5$; 4-OH" should read -- -- 6-Cl; 2-$OC_2H_4OC_2H_5$; 4-OH --; line 37, "6,7-di-Br; 2-$OC_1H_4OC_2H_5$; 4-OH" should read -- 6,7-di-Br; 2-$OC_2H_4OC_2H_5$; 4-OH --.

Signed and sealed this 23rd day of December 1969.

(SEAL)
Attest:

Edward M. Fletcher, Jr.                                WILLIAM E. SCHUYLER, JR.

Attesting Officer                                                 Commissioner of Patents